United States Patent [19]

Brandwajn et al.

[11] Patent Number: 5,625,751
[45] Date of Patent: Apr. 29, 1997

[54] NEURAL NETWORK FOR CONTINGENCY RANKING DYNAMIC SECURITY INDICES FOR USE UNDER FAULT CONDITIONS IN A POWER DISTRIBUTION SYSTEM

[75] Inventors: Vladimir Brandwajn, San Jose; Ali Ipakchi, San Carlos; A. B. Ranjit Kumar, Cupertino; Gerald W. Cauley, San Jose, all of Calif.

[73] Assignee: Electric Power Research Institute, Palo Alto, Calif.

[21] Appl. No.: 297,987

[22] Filed: Aug. 30, 1994

[51] Int. Cl.$^6$ .............................. G06E 1/00; G06E 3/00; G06F 15/18
[52] U.S. Cl. ............................. 395/22; 395/21; 395/907
[58] Field of Search ........................... 395/20–27, 907, 395/915; 382/155–159; 455/3.1, 3.3; 364/492–494

[56] References Cited

U.S. PATENT DOCUMENTS 5,469,528  11/1995  Douglas et al. ........................... 395/23

OTHER PUBLICATIONS

Kumar et al, "Neural networks for dynmaic security assessment of large–scale power systems: requrieiments overview"; Proceedings of hte first international forum on applications of neural networks to power systems, p. 65–71, 23–26 Jul. 1991.

Aggoune et al, "use of artificial neural networks in a dispatcher training simulator for power system dynamic security assessment"; 1990 IEEE international conference on systems, man, and cybernetics conference proceedings, pp. 233–238, 4–7 Nov. 1990.

Pao et al, "combined use of unsupervised and supervised learning for dynamic security assessment"; 1991 Power industry computer application conference, pp. 278–284, 7–10 May 1991.

Djukanovic et al, "neural net based determination of generator-shedding requirements in electrical power systems"; IEEE Proceedings C, vol. 139, iss. 5, pp. 427–436.

Liangzhong et al, "estimation of transient stability limits using artificial neural network"; Proceedings TENCON '93, pp. 87–90 vol. 5, 19–21 Oct. 1993.

Article entitled "Dynamic Security Assessment of Power Systems Using Back Error Propagation Artificial Neural Networks", by M.A. El–Sharkawi, R.J. Marks, M. E. Aggoune, D.C. Park, M.J. Damborg, L.E. Atlas, Second Symposium on Expert Systems Applications to Power Systems, Jul. 17–20, 1989, Seattle, USA.

Article entitled "Artificial Neural–Net Based Dynamic Security Assessment for Electric Power Systems", by Dejan J. Sobajic and Y.H. Pao, IEEE Transactions on Power Systems, vol. 4, No. 1, Feb. 1989.

(List continued on next page.)

Primary Examiner—Tariq R. Hafiz
Attorney, Agent, or Firm—Flehr Hohbach Test Albritton & Herbert LLP

[57] ABSTRACT

Analysis and evaluation of outage effects on the dynamic security of power systems is made with a neural network using composite contingency severity indices. A preferably small number of indices describes the power system characteristics immediately post-contingency. These indices are then used as classifiers of the safety of the power system. Using the values of the severity indices, an artificial neural network distinguishes between safe, stable contingencies and potentially unstable contingencies. The severity of the contingency is evaluated based upon a relatively small fixed set of severity indices that are calculated based on a partial time domain simulation. Because a fixed set of severity indices is used, the size and architecture of the neural network is problem independent, thus permitting its use with large scale power systems. Further, the amount of required time domain simulation for the selection of the potentially harmful unstable contingencies is reduced by screening out benign, stable appearing contingencies. The network is trained off-line using training cases that concentrate around the security boundary to reduce the number of cases required to train the neural network.

15 Claims, 9 Drawing Sheets

OTHER PUBLICATIONS

Article entitled "An Artificial Neural-Net Based Technique for Power System Dynamic Stability with the Kobonen Model", by Hiroyuki Mori, Yoshihito Tamaru, Senji Tsuzuki. Transactions on Power Systems, vol. 7 No. 2, May 1992.

Article entitled "Combined Use of Unsupervised and Supervised Learning for Dynamic Security Assessment", by Y.H. Pao and Dejan J. Sobajic, Transactions on Power Systems, vol. 2, No. 2, May 1992.

NEURAL NETWORK FOR CONTINGENCY RANKING DYNAMIC SECURITY INDICES FOR USE UNDER FAULT CONDITIONS IN A POWER DISTRIBUTION SYSTEM

FIELD OF THE INVENTION

The invention relates to systems for analyzing failure modes associated with electrical power distribution systems, and more specifically to analytical techniques that determine whether there is a need to reconfigure a system to ensure continuing functionality following a system fault.

BACKGROUND OF THE INVENTION

Utility companies generate electrical power, often at many hundred thousand volt levels, and distribute the power over a reconfigurable grid system to various customer loads. Conservative system design requires anticipation of the many contingent modes of failure that may occur in such a system. It is understood that a fault contingency is a sequence of events, the first of which is usually (but need not be) a fault, for example a falling tree severing a power-carrying line. For example, if a generator fails to output sufficient power, the defective generator must be taken off-line to remove the fault condition. Next, the grid is reconfigured so customers formerly supplied electricity from the failed generator can receive power from another generator. Of course many other faults can also contribute to a system failure.

Any of these failure modes, and others as well, may lead to fault conditions that can damage the distribution system, perhaps catastrophically, and/or can cause great inconvenience to the customer. In each instance, once the defective system components are identified and taken off-line, a post-fault system equilibrium condition is attained and analyzed. A decision is then made whether it is necessary to reconfigure the grid in a given fashion to continue to supply electricity, to the best of available resources.

But once post-fault equilibrium condition is reached, the grid may be reconfigured in a great number of ways, some of which will be more optimum than others. Further, determining the best reconfiguration of the remaining system may have to be accomplished within a matter of minutes. The problem then is how to best determine an optimum system reconfiguration in a finite amount of time.

Most prior art dynamic security analysis techniques assume that predicting system security with respect to a given contingency, requires a knowledge of (a) the post-fault equilibrium condition, (b) severity of the disturbance as given by system state deviation system immediately after fault-clearing from post-fault equilibrium, and (c) system ability to withstand the disturbance as given by the maximum potential energy at the relevant unstable equilibrium point of the post-fault system. Although attempts have been made to use these quantities to develop a severity index to quickly rank and screen contingencies, including variants of the transient energy function ("TEF"), computational inefficiency resulted.

The prior art approach requires computation of the post-fault equilibrium, a potentially complex computation. Although some contingencies may be harmless, the prior art approach does not permit a simple screening out of such contingencies. In essence, the prior art attempts to capture the dynamic state of the system with a single index, with which index contingencies may be precisely ranked. However, this approach is extremely computational intensive and may require many hours of calculation before a meaningful decision can be derived. However, during the rather lengthy analysis period, the grid cannot be intelligently reconfigured.

It is known in the art to attempt to employ neural networks in the power system security field to form a continuous input/output model of non-linear systems, as a classifier. Less commonly, such networks are employed as a decision tree with learned criteria. Artificial neural network methodology is based on developing models of elementary processing units. Simple local connection strength modulation procedures are formulated such that the strengths are adjusted to reflect complex input/output relationships, wherein each neural network node is a processing element. In a simple back-propagation implementation, each node sums a collection of weighted inputs, and passes the result to its output through a non-linear transformation function. This function could be a relay or a saturation along with a threshold value, a sigmoid function, or other similar function. When the non-linearity is a relay, the resulting output merely is a classification of the input as belonging to one or the other of the two half-spaces formed by a hyper-plane in the space of the input variables.

Those skilled in the art recognize that a typical neural network requires training before actual use, with training occurring in a supervised training mode or in an unsupervised training mode.

Supervised training of neural networks includes identifying the weights associated with the inputs at each node for a given set of threshold values. This is accomplished by first selecting the threshold values for each node and the initial values for the weights. A set of training inputs is then presented to the network, and the output is compared to the desired outputs. The error at the output of each node is used to modify the weights appropriately, e.g., by simple rules and known algorithms. Suitable algorithms are described in the Proceedings of the IEEE, September and October 1990, Special Issue of Neural Networks, I Theory and Modeling, and II Analysis, Techniques and Applications. The selected set of training inputs are presented again and again until the output errors are within the required tolerance. The quality of the results of the neural network depends on the quality of the selected topology, the values of the thresholds, and the training data.

Unsupervised neural network training may be done in two methods. The first method is similar to that of associative memories, where the neural network automatically divides the input samples into appropriate clusters. Kohonen networks are a good example of such classifiers. In the second method, some of the connections between the nodes act as feedbacks from the outputs of nodes at a later level, with outputs of the nodes oscillating until settling down to an equilibrium points. Such networks are known as Hopfield networks.

Unfortunately, dimensionality-associated problems have precluded the successful use of neural networks in the assessment of power system security. For example, M. A. El-Sharkaswi et al., Proceedings of the Second Symposium on Expert Systems Application to Power Systems, Univ. of Washington, Seattle, Jul. 17–20, 1989, p. 366–370 attempted a dynamic security assessment of a three generator power system using an artificial neural network. The fifteen-neuron network identified the operating region wherein the real part of all eigenvalues were negative, but over 400 training sets were required before the neural network would perform satisfactorily.

Another experimenter, Y. H. Pao, IEEE Trans. on Power Systems, Vol. 4, No. 1, February 1989, used a seven-neuron Rumelhart feed-forward net with an error back-propagation learning scheme to predict the critical fault clearing time ("CCT") of a power system having 4 generators and 7 lines. Thirty twelve-dimensional training sets were obtained using two different topologies (full system and one line outaged) and 15 different loading levels. The desired training mode output were the CCTs for a fault at a prescribed bus. The neural network was able to predict the CCTs for different loading levels with remarkable accuracy, both for the two topologies used in the training sets, as well as a new topology where a different line was outaged. However, this performance was achieved after presenting the training set to the network 5010 times.

H. Mori et al., Proceedings of PICA, May 7–10, 1991, Baltimore, p. 293–301, used an unsupervised competitive learning scheme based on the Kohonen Model. Mori et al. presented 5000 operating conditions of a 3 generator, 9 bus, 9 line system to a neural net acting as a self-organizing feature mapping system. The 5000 training cases were mapped automatically into a two dimensional square grid of 900 cells.

Yet another attempt reported by Y. H. Pao et al., Proceedings of PICA, May 7–10, 1991, Baltimore, p. 278–284 used a combination of unsupervised and supervised learning schemes. These experimenters considered a 4 generator, 6 bus, 6 line system using 138 training patterns (of 20 features each) for three different topologies. The unsupervised training process classified these patterns into 13 clusters, wherein for each cluster, a supervised training procedure calculated the critical fault clearing time (CCT) using only one neuron for each cluster.

These prior art approaches have a number of characteristics in common in that they all considered small system models, wherein the employed methodology could not readily be easily extended to a practical sized system. Further, in these approaches, the size of the neural network was a function of the system size in that increasing system size would drastically increase the required processing time. Further, prior art techniques make no clear definition of neural network inputs or the type of outputs from the neural network.

What is needed is a more rapid method for dynamically ranking contingencies following a fault in a power distribution system. Such method should result in a practical cal on-line dynamic security analysis system that can deal with realistic power system models comprising thousands of buses and hundreds of generators. Preferably such method should provide meaningful and objective benchmark guidance as to reconfiguring the grid within minutes rather than hours of a fault condition. Further, the analytical methodology should be independent of the complexity of the system under analysis.

The present invention discloses such a method.

SUMMARY OF THE PRESENT INVENTION

The present invention can analyze hundreds of fault contingencies presented to an electrical power system within a matter of minutes, and can provide prompt meaningful guidance to the system operator. The present invention assumes that ability of a power system to withstand a disturbance may be inferred from the evolution of various dynamic security indices in a few steps of time-domain simulations following fault clearing. Severity of a contingency is evaluated based on a small fixed set of composite severity indices that capture or describe power system post-fault characteristics, and that may be quickly calculated very early in the simulation process.

The indices preferably include change in generator rotor angles, speed, kinetic energy, acceleration, as well as changes in bus voltages. Preferably, the maximum phase angle deviation (DELDEL) and maximum bus voltage dip (VLTDIP) are used as objective benchmarks of system safety and stability, for reliable evaluation of the ranking capabilities of various severity indices for the severity of the contingency under consideration.

Before a fault occurs, a pre-fault equilibrium state exists for the power system, which equilibrium state is altered after the occurrence of the fault. Using the composite set of indices as inputs, a trained artificial neural network measures disturbance severity due to the fault. This is done by examining the deviation of the power system state immediately after fault-clearing relative to the pre-fault equilibrium state. In ranking the various contingencies presented, the effects of the contingencies in the multi-dimensional space of state variables of the power system are mapped to a single dimensional severity space. This methodology eliminates the conventional need to compute post-fault equilibrium and also eliminates the computational issues related thereto.

In a multi-layer neural network contingency screening process, the initial layer can use a very fast method to screen out definitely harmless, stable, contingencies. As a result, time domain simulation computational power is reserved for analysis of unstable, contingencies that present a real threat to the power system. Further, the use of a highly reduced fixed set of severity indices permits (as contrasted to a traditional complete set of state variables) the artificial neural network to achieve a rapid dynamic ranking of the contingencies. This ranking is achieved, while advantageously permitting the size and architecture of the neural network to be independent of the problem under analysis.

The network is trained in an off-line model derivation mode using pair sets of index values generated using complete off-line time domain simulation, and using corresponding system stability classifications. Training time and the number of training cases are minimized by using representative contingency and configuration line and generator samples that concentrate about a security boundary.

In calculating each composite index, the change from pre-fault steady-state condition is determined for each system variable relevant to the index. The calculated value is then normalized, and the normalized value is raised to a power of perhaps 10 to amplify the effect of large changes and to mask reduce the effect of numerous small changes. The resulting individual terms are then summed to yield a composite index for the entire power system.

Computation of the composite indices may be accomplished with a transient stability simulation program that is initialized with the power system description corresponding to the state of interest. A contingency description, or list of switching events, is then presented to the simulation program and simulation is initiated. Following the last pre-defined switching event the simulation is halted and a set of composite indices is calculated and provided as input to a multi-layer neural network. Other features and advantages of the invention will appear from the following description in which the preferred embodiments have been set forth in detail, in conjunction with the accompanying drawings.

DETAILED DESCRIPTION OF THE PREFERRED EMBODIMENT

In brief overview, the present invention recognizes that the complexity of a power system makes it difficult to reliably capture the dynamic state of the system with a single index. Rather than commit substantial time attempting to derive a single index to precisely rank contingencies, the present invention identifies a few indices that collectively can lead to a fast and reliable composite ranking. A set of measures of system state is defined to describe the severity of a contingency in a power system, where the number of these dynamic severity indices is independent of the size of the power system.

The multiple severity indices are intended to capture different aspects of the power system state so as to reflect the effect of the contingency. The aspects to be considered may include change in bus voltages, change in kinetic energy or change in reactive generation, which changes are measured with respect to the pre-contingency conditions. Experience from static security analysis has shown that such multiple severity indices can capture the characteristics of post-contingency system response.

To be independent of any particular power system topology, the dynamic severity indices should satisfy several conditions, and specifically should include the influence of all system components belonging to a particular class, e.g., sum of reactive power changes at all generator terminals. The indices should also be insensitive to the effects of masking, e.g., for each component, the individual change is raised to a high degree to accentuate the difference between small and large variations. Further, the indices preferably should be normalized by a system specific quantity to be configuration independent.

The indices describe the conditions of the power system in terms of the deviation from the pre-fault steady-state. The calculation of the indices is performed shortly after the fault clearing to allow the effects of the last switching to propagate through the entire system.

Using the above-described techniques, the present invention can analyze hundreds of transient and dynamic stability contingencies every ten to thirty minutes using on-line data provided by the state estimation. The power system operator thus receives timely information with respect to transfer limits and stability margins, and may act accordingly to preserve integrity of the operating system.

It is important to appreciate the speed requirements for real-time dynamic security analysis simulation according to the present invention. Realistically a power system will include a great many voltage generators and perhaps 2,500 bus power sub-systems. It is important that no potential contingencies be excluded from the analysis, and thus as many as 500 contingencies must be accounted for. A total simulation should occur in less than an hour, and preferably in about 30 minutes, with perhaps a 20 second stability simulation requirement.

Figure 1:
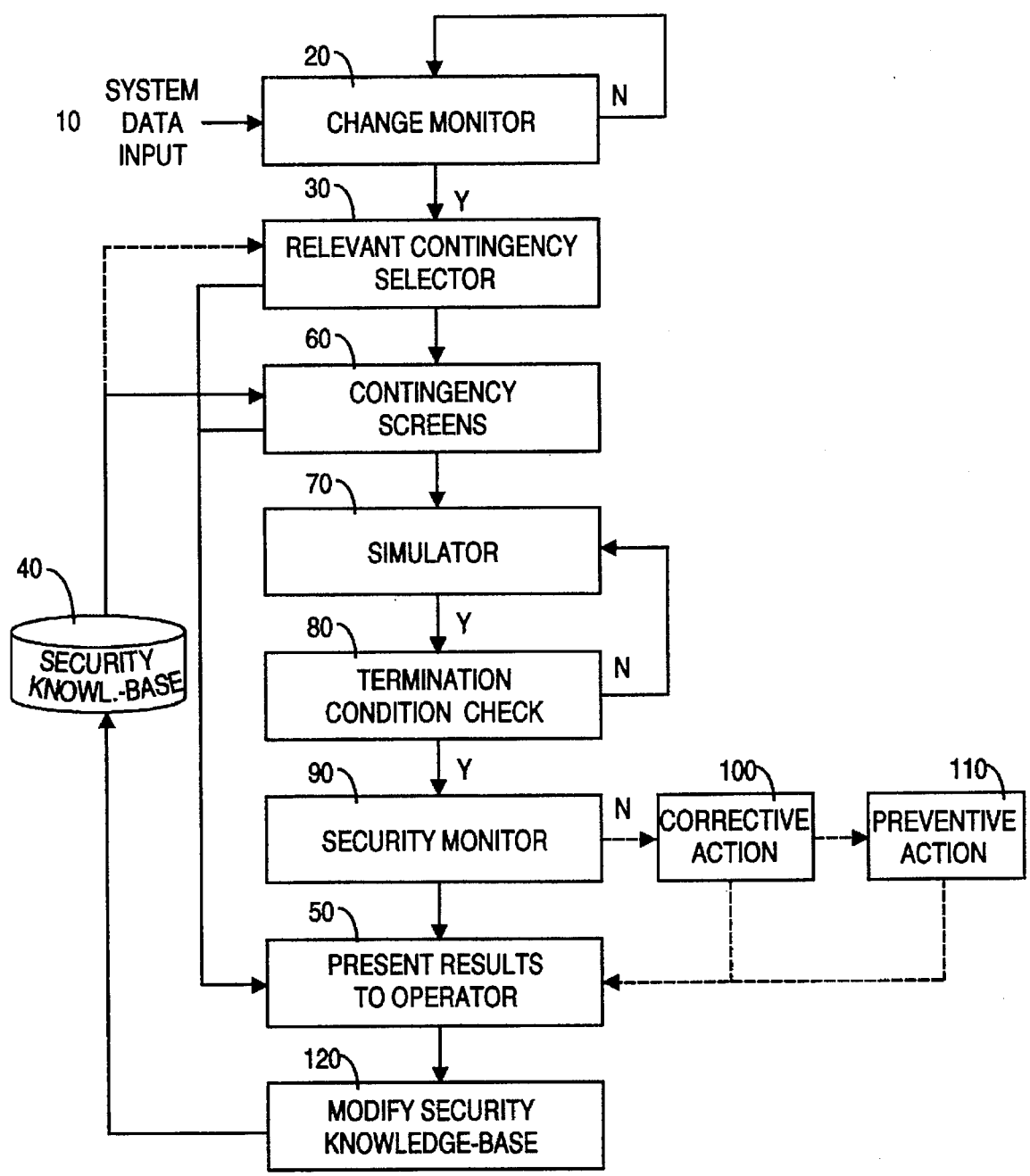
FIG. 1 is a block diagram depicting methodology of an on-line dynamic security analysis system, according to the present invention.

FIG. 1 is a block diagram of a preferred methodology of the present invention, to which data 10 is input from the power system (not shown) that is being monitored. This data is input to a change monitor procedure 20 that examines the data to determine whether any changes in system conditions since the previous assessment are significant enough to warrant a new assessment. If not significant, no new assessment occurs.

However, if a significant change in systems is detected, at step 30 contingencies relevant to the current system state are selected for further evaluation. Traditionally this selection typically is done by the system operator or engineer, based upon engineering experience. These relevant contingencies are based on the operating conditions of the power system under examination. Understandably these conditions can change as a result of forced and scheduled outages, as well as changes in customer demand. It is important that no potentially severe credible contingency be excluded or overlooked. However, it is also true that selecting a set of contingencies without regard to the operating conditions will result in a set that is too large or too small. While selection of a few marginal cases is acceptable, it is understood that the exclusion of a single severely unstable case may be catastrophic.

Thus, at step 30, if a significant undervoltage condition has been detected, the system operator/engineer can now select contingencies germane to such state. Germane contingencies would include, for example, loss of a generator in the vicinity of the undervoltage, loss of a transmission line in the vicinity of the undervoltage, etc.

As shown in FIG. 1, a security knowledge-database 40 stores relevant contingency selection information. Preferably the security knowledge-database 40 contains data representing historically accurate contingencies that have been properly analyzed, as confirmed by human experts and/or by computer analysis. As indicated by the dashed lines, in a future embodiment the information within this database 40 will automatically be provided as an input to process step 30. In such implementation, the database itself could dictate the contingency selection, or could augment the experience of the system operator or engineer who presently makes the step 30 decision. Note that the contingency selection may be presented to the system operator at step 50.

At step 60, the contingencies are screened to evaluate whether the present power system state is secure with respect to a given contingency. This is accomplished by simulating the contingency until a few time steps after the fault event and then evaluating deviation of the system state from the prefault state. The deviations are then translated into subset of composite indices that are then used as inputs to the neural network to yield an indication of relative stability of the power system in the presence of the contingency.

The result of step 60 is that an input set of relevant contingencies is screened down to a smaller sub-set of contingencies that are relevant to a potentially unstable state of the power supply system. Note that a sufficiently non-threatening set of contingencies, in response to the detected fault condition, can branch the procedure to step 50, wherein the present contingency evaluation is displayed to the system operator.

At step 70, simulation begins and a determination is made of the configuration and the transient state of the power system. This determination is made at the end of a simulated time segment, preferably using numerical integration techniques.

The simulation results are presented to step 80, wherein a termination condition check is made. Step 80 determines whether the power supply system in the presently configured simulation will come to a steady-state. If not, the simulation at step 70 continues. However, if step 80 determines that a steady-state condition will be attained, the procedure continues to step 90.

At step 90, the security of the system is monitored, and an evaluation is made of the acceptability, or security, of the post-fault contingency steady-state. Step 90 preferably includes checking for branch overloads, bus voltage and reactive generation limit violations, in addition to checking the location and amount of lost load/generation. The determination at step 50 preferably is presented to the system operator at step 50.

If, however, step 80 determines that the post-contingency state will not result in an acceptably secure power system, step 100 in a future embodiment will determine if timely post-contingency corrective actions exist to force the system to an acceptably secure state. However, if corrective actions do not exist, in a future embodiment step 110 will determine the necessary precontingency preventive action(s), and will inform the system operator at step 50.

It is understood that step 50 may be accomplished in many ways, including using a display on a computer terminal, perhaps a workstation monitor, using a system of display warning lights, among other mechanisms including audible warnings.

At step 120, the security knowledge-database 40 is modified to add significant new information about the present contingency, and to add the initial operating conditions to the existing knowledge database. So augmented, security knowledge-base 40 will, in a future embodiment, be able to supply additional information for use at selection step 30.

With further respect to the knowledge-database 40, the present invention employs a rule-based expert system that selects relevant contingencies based upon pre-contingency steady-state data of the power system. With respect to important power lines, applicants developed rules mimicking a human expert who considers various attributes of the transmission lines that may be detrimental to system dynamic security. For each of the associated attributes, threshold values are defined, based upon previous experience. Thus, a line outage is considered important if any of the real or apparent power, reactive power, the ratio of reactive power to real power, or the phase angle across the line are large.

Similarly, the present invention employs rules for important power-carrying lines. A fault at a bus is considered important if any of the total power flow towards or away from the bus, the total real or reactive load or generation of the bus are large. A knowledge of the important buses in the power system helps screen the number of lines selected for further analysis. Thus, if a bus is not important, outages of lines connected to that bus are not selected for study. If, for example, the power system is secure for the outage of a line carrying the maximum amount of power to or from an important bus, then the system is also secure for outages of other lines carrying power to or from that same bus.

Some areas of the power system will be more important than others, and some interfaces (e.g., some groups of lines that represent a vulnerable portion of the system) will be more important than others. Each interface is associated with a "sending" area and a "receiving" area. An interface is important if the power carried by it is large with respect to the generation in the sending area, to the load in the receiving area, or the inertia in the sending or the receiving area. It may be assumed that if the system is secure with respect to the outage of the line carrying the most power in an interface, that the system is also secure relative to the outage of any single line outage in that interface. For this reason, it suffices to select only the most important line(s) of the interface.

As noted, in contrast to the prior art, the present invention seeks to capture the risk potential to a power system using a relatively small number of severity indices.

Figure 2:
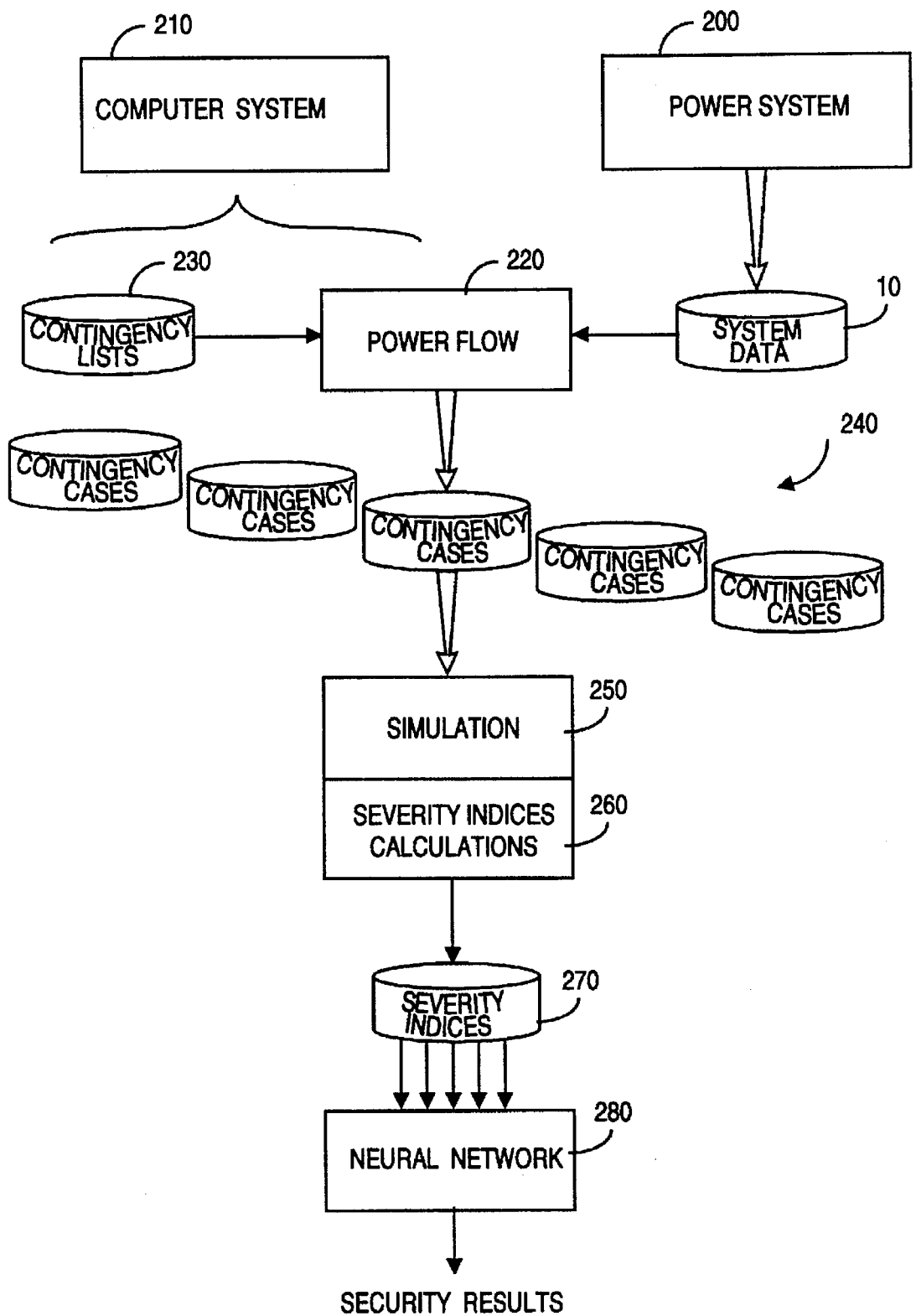
FIG. 2 depicts a preferred implementation of the methodology of FIG. 1, according to the present invention.

FIG. 2 depicts a preferred implementation of the methodology described with respect to FIG. 1. In FIG. 2, the power system 200 being monitored generates system data 10, which data may be identical to what was shown in FIG. 1. A computer system 210 such as a workstation with operator input keyboard or similar controls and with output display capability controls much of the process depicted in FIG. 2.

The system data 10 is provided as input to a power flow unit 220, namely a computer program that calculates the steady state solution of the power system. One such program is as the EPRI Interactive Power Flow (IP) program, available through the Electric Power Research Institute, Inc., located in Palo Alto, Calif. Those skilled in the art will recognize that many other such software programs may instead be used.

Figure 3:
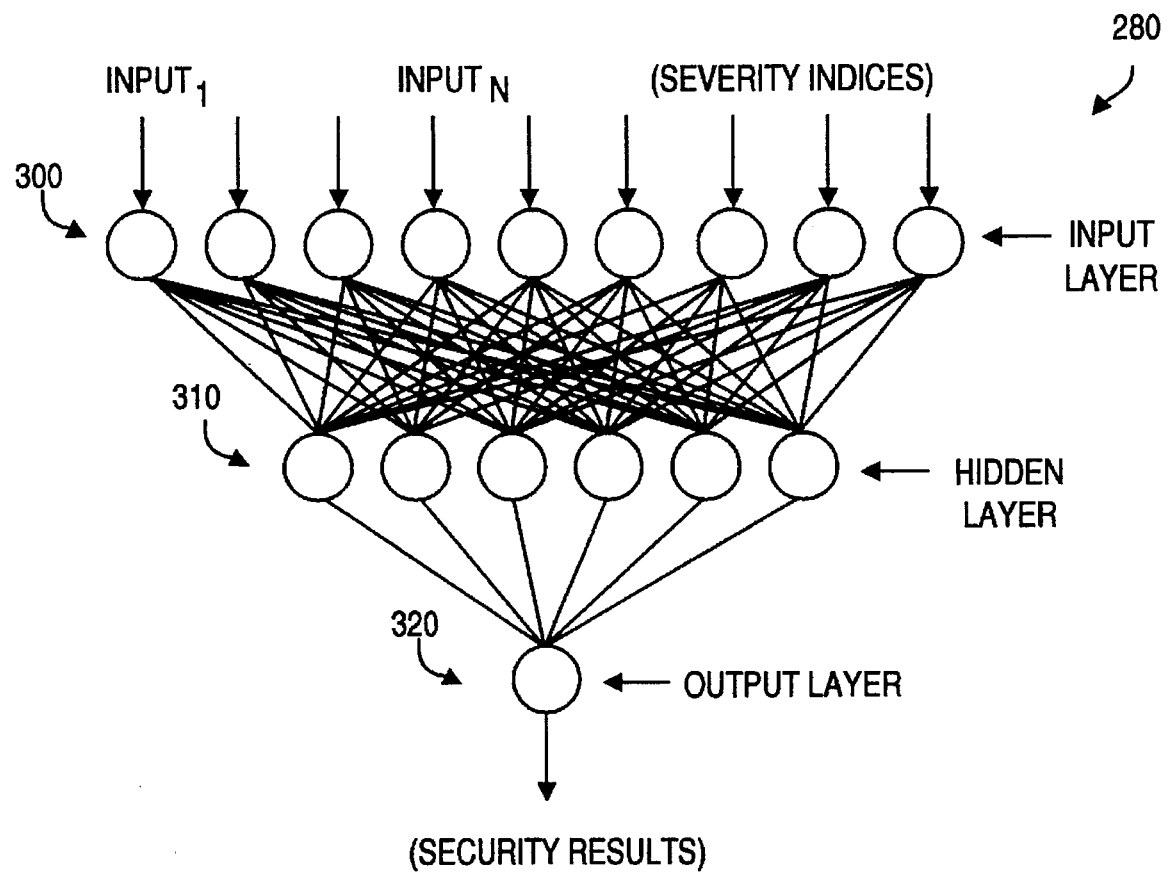
FIG. 3 depicts a generic multi-level neural network, with which the present invention may be practiced.

As shown in FIG. 3, the power flow unit 220 also receives as input a list of contingencies 230. These contingencies may be stored in a database such as knowledge database 40 in FIG. 1. In the event of a failure, e.g., low voltage from a generator, unit 220 outputs notice of the fault which is screened through a stored base of contingency cases 240 for screening. The screening preferably corresponds to method step 60 shown in FIG. 1.

The screened output is provided as input to a simulation program 250 that preferably implements the simulation step 70 described with respect to FIG. 1. In the preferred embodiment, software 250 included algorithms used as a subroutine for the Extended Midterm Stability Program ("ETMSP V2P"), available through Electrical Power Research Institute, Inc. located in Palo Alto, Calif. Still under control of computer system 210, severity indices are calculated 260, and the generated severity indices 270 are provided as inputs to a neural network 280. Generation of the severity indices 270 corresponds generally to method step 80 in FIG. 1.

Preferably the software implementation shown in FIG. 2 automatically computes severity measures for each contingency, and stores the computed measures in files for further processing. Additional software can then analyze the behavior of each index across various contingencies.

One objective of contingency classification in the present invention is to identify contingencies that are definitely harmless, to avoid their full simulation, which would require time and system resources. Because the dynamic security severity indices 270 often contain complementary information whose pattern may not be obvious to a human operator, the ability of neural network 280 to detect such hidden patterns is utilized. Preferably, for each contingency the indices are calculated and their values are used as inputs to a neural network that classifies the contingency as either definitely harmless or potentially harmful.

This approach is a departure from traditional use of neural networks in the sense that the present invention uses highly reduced information instead of a complete set of state variables. The preferred use of a network size-independent set of severity measures enhances the ability of this approach to handle large scale power systems. Further, the neural network classification process is very fast, and the present invention brings significant benefits to on-line dynamic security analysis.

In the preferred embodiment, the severity indices 270 used to capture the risk to the system security due to increased loading of generators, low voltages in the system, and the like include:

generator real power output, normalized by that generator's moment of inertia generator reactive power output, normalized by that generator's moment of inertia generator apparent power, normalized by that generator's moment of inertia generator bus voltage generator rotor angle (DELTA) with respect to the center of inertia generator (Q-Qbias)/P, where Q is reactive power, Qbias is a user-specified tuning parameter, and P is real power The following examples of indices are aimed at capturing the effects of increased line loads, and vulnerability of the "down-stream" system as seen from the sending end of the line:

line sending end real power (P), normalized by line reactance line sending end reactive power (Q), normalized by line reactance line phase angle line sending end (Q-Qbias)/P The following are examples of indices intended to capture the effects of low bus voltages, high bus loads, high power transfers over pre-specified interfaces, and overall system loading:

bus load, normalized by admittance of the lines bus voltage real power flows in pre-specified interfaces, normalized by admittance of available lines in the interface reactive power flows in pre-specified interfaces, normalized by admittance of available lines in the interface system reactive power generation (TOTQ), normalized by sum of P system stress, defined as the sum of [(P*DELTA)/(sum of P)]−0.5*TOTQ The following indices describe the transient, e.g., dynamic, conditions shortly after fault-clearing:

change in speed of generator change in kinetic energy of generator (KE)

acceleration of generator approximate potential energy of generator (PE)

approximate energy ratio (i.e., KE+PE) as a fraction of an approximate maximum possible potential energy of generator (PEMAX)

speed of system center of inertia

The above discussed concept of severity indices can be expanded to other approaches such as the driving point impedance. Methods based on this approach attempt to capture the power system as seen from a generator in a few parameters, e.g., an equivalent single machine connected to an infinite bus. The equal area criterion can be used to compute an approximate energy margin as a dynamic severity index.

In the present invention, dynamic security is analyzed using neural networks (e.g., neural network 280 in FIG. 2) that are trained for contingency screening. The networks preferably receive two classes of dynamic indices as inputs, namely line indices and generator indices. Each index is defined as:

$$\text{Index} = \Sigma(\text{TERM}^n) \text{ for all components}$$

In the following definitions, only TERM is defined, and the exponent "n" is indicated along with the mnemonic name of each index. "Prefault" refers to system values before the fault condition occurs, and "ABS" defines the absolute value of a parameter. Of course more or less than the following thirty-nine indices may be used.

For the line indices, four components preferably are considered:

(1) Line Power Index:

PLINDX, n=10

IF (Power>Prefault Value) THEN

Term=(Power−Prefault Value)/(Limit−Prefault Value), where Limit=ABS(Line Admittance)

ELSE

Term=(Prefault Value−Power)/(Prefault value+Limit)

(2) Line Reactive Power:

QLINDX, n=8

IF (Reactive Power>Prefault Value) THEN

Term=(Reactive Power−Prefault Value)/(Limit−Prefault Value), where Limit=2*ABS(Line Admittance)

ELSE

Term=(Prefault Value−Reactive Power)/(Prefault value+Limit)

(3) Line Phase Angle:

DIIndx, n=10.

Similar to the above, except Limit=0.8*PI, where PI=π= 3.14159

(4) Line Apparent Power:

QPLINDX, n=8.

Similar to the above, except

Limit=2*ABS(Line Admittance) and

TERM=0 if the apparent power<prefault value.

For the generator indices, thirty-four components preferably are considered:

(5) Generator Power Increase:

GPINDX1, n=6
IF (Power>Prefault Value) THEN $$\text{Term} = \frac{(\text{Power} - \text{Prefault Value})}{(\text{Limit} - \text{Prefault Value})}$$

ELSE

Term=0

(6) Generator Power Decrease:

GPINDX2, n=6
IF (Power<Default Value) THEN $$\text{Term} = \frac{(\text{Prefault Value} - \text{Power})}{(\text{Prefault Value} + \text{Limit})}$$

ELSE

Term=0

(7) Generator Power Deviation:
  GPINDXS, n=6
  GPINDXS=GPINDX1+GPINDX2
(8) GPINDXD:
  Is the difference (GPINDX1−GPINDX2)
(9) Acceleration Index:
  AINDXS, n=6

Term=(Power−Prefault Value)/(200.0*Inertia)

(10) AINDX1−>uses only positive valued terms of AINDXS
(11) AINDX2−>uses only negative valued terms of AINDXS
(12) AINDXD=AINDX1−AINDX2
(13) Angle Deviation Index:
  DINDX, n=6

Term=(Position with respect to CI−prefault position with respect to CI)/4*PI

(14) Relative Speed Index: RSINDXS, n=6

Term=(Speed with respect to CI)/(Synchronous Speed)

IF (Term<−2) term=−2
IF (Term>2) term=2
(15) RSINDX1−>uses only positive terms of RSINDXS
(16) RSINDX2−>uses only negative terms of RSINDXS
(17) RSINDXD=RSINDX1−RSINDX2
(18) Absolute Speed Index:
  SINDXS, n=6
  Term=20*(Speed with respect to Synchronous Ref.)/(synchronous speed)
  If (Term<−2)term=−2
  If (Term>2)term=2
(19) SINDX1−>uses only positive terms of SINDXS
(20) SINDX2−>uses only negative terms of SINDXS
(21) SINDXD=SINDX1−SINDX2
(22) Internal Reactive Power Index:
  QINDX, n=6

Term=Q_internal*XDPRIME/10.0

(23) Internal Reactive Power Deviation Index:
  QDINDX n=6

Term=(Q_Internal−prefault value)/(6.0*MVA Rating)

(24) Internal Apparent Power Deviation Index:
  APINDX n=6
  IF(Apparent Power>Prefault Value) THEN Term=Apparent Power 1(6.0* MVA Rating)

(25) Terminal Apparent Power Deviation Index:
  TAPINDX n=6
  IF (Terminal Apparent Power>Prefault Value) THEN Term=Terminal Apparent Power/(6.0*MVA Rating)

(26) Voltage Deviation Index:
  GVINDXS, n=6

Term=Voltage−Prefault Value

(27) GVINDX1: Uses only positive terms of GVINDXS
(28) GVINDX2: Uses only negative terms of GVINDXS
(29) GVINDXD=GVINDX1−GVINDX2
(30) Generator Stress Index
  STINDX, n=6

Term=(Q_Internal−P_Internal*Position with respect to Center of Inertia +K.E.)/(Inertia*200)

(31) Generator Stress Deviation Index
  STDINDX, n=6

Term=(value of stress−prefault value)/(50.0*MVA Rating)

where stress=q_internal−P_internal*Position with respect to CI+KE
(32) System Generation:
  SYSP, n=0

Term=P_Internal

(33) System Generation Deviation:
  SYSPDEL, n=6

Term=(P_Internal−Prefault value)/(4.0*MVA Rating)

(34) System Reactive Generation:
  SYSQ, n=0

Term=Q_Internal

(35) System Reactive Generation Deviation:
  SYSQDEL, n=6

Term=(Q_Internal−Prefault value)/(6.0*MVA Rating)

(36) System P*D:
  SYSPD, n=0

Term=P_Mechanical*Position with respect to CI

(37) Deviation in system P*D:
  DELPTD, n=6

Term=P_Mechanical*(position with respect to CI−prefault value)/(12.0*MVA Rating*PI)

(38) System Kinetic Energy:
SYSKE, n=0

Term=0.5*Inertia*(Speed with respect to CI)$^2$

(39) System Kinetic Energy in Synchronous Reference Frame:
SYNCKE, n=0

Term=0.5*Inertia*(Speed with respect to Synchronous Reference)$^2$

FIG. 3 depicts the topology of neural network 280 generically, wherein nine nodes and three layers are shown, although a different number of nodes, and more than three layers may be used. The uppermost layer 300 is the input layer, which can include as many nodes as the number of input parameters required by the system. With reference to FIG. 2, the inputs to layer 300 are the severity indices 270.

Beneath the input layer is the hidden layer 310, which receives values of the input parameters for the net from the input layer 300. The hidden layer may include more than one layer, with each such layer including any number of nodes that the system requires. In FIG. 3, hidden layer 310 is shown as including a single layer having six nodes. Those skilled in the art will appreciate that specifying the hidden layer structure and the number of hidden nodes is, at present, primarily a matter of design experience.

The last layer 320 is the layer for the output parameter(s). While more than one output may be provided, only a single layer 320 is depicted.

In a neural network 280 as shown in FIG. 3, every input parameter has a link to every node in the first layer of the hidden layer. If more than one hidden layer 310 is present, every node in one hidden layer will have a link to every node in the next layer of the hidden layer. Further, every node in the last hidden layer is linked to every node of the output layer.

Each node, or neuron, in the hidden and output layer is associated with an activation function that produces the activation level or output of the node upon being presented with the sum of the weighted input values to the node. Thus, the output from a neuron receiving i inputs, each having a weighting factor $w_i$ may be given by:

Output=$s(Z)\Sigma w_i *$input$_i$

In the preferred embodiment, the activation was a sigmoidal function s(Z) having the following form:

$s(Z)=1/(1+e^{-\alpha(Z-\beta)})$ where $\alpha$ defines the steepness of the function, and $\beta$ is the threshold of the function. This function has values of 0, 0.5, and 1 for Z–$\beta$ values of $-\infty$, 0, and $+\infty$ respectively.

The corresponding derivative of the function is:

$s'(z)=\alpha(1-s(z))s(z)$

The algorithm used for the neural network software was based on the generalized delta rule or the steepest gradient descent. The delta rule defines the changing rule of the weights upon presentation of an input/output pair p, and is given by:

$\Delta_p w_{ji}=\eta(t_{pj}-o_{pj})i_{pi}=\eta\delta_{pj}i_{pi}$ (1)

$\delta_{pj}=t_{pj}-o_{pj}$ (2)

where $t_j$ is the output target value for node j, $o_{pj}$ is the actual output value of node j obtained from presentation of the input pattern p, $i_{pi}$ is the input value of the i-th input element, $\delta_{pj}$ is the prediction error, and $\Delta w_{ji}$ is the change in weights from i-th to j-th node to be made upon the presentation of an input/output pair.

The generalized delta rule for linear systems will now be briefly described. For systems with linear activation functions it can be shown that the delta rule minimizes the squares of the differences between the actual and the desired output values summed over all the output nodes (if more than one) and all pairs of input/output patterns. This may be shown by demonstrating that the derivative of the prediction error with respect to each weight has negative proportionality to the weight change defined by the delta rule.

This derivation is shown by equations (3) to (9) as follows:

The error upon presentation of input/out pattern p for a system with j output nodes is:

$E_p=0.5*\Sigma_j(t_{pj}-o_{pj})^2$ (3)

$E=\Sigma E_p$ (4)

where E is the error upon presentation of all the input/output patterns. When there are no hidden nodes, the derivative of the $E_p$ with respect to $w_{ji}$ can be written using the chain rule as:

$\partial E_p/\partial w_{ji}=(\partial E_p/\partial o_{pj})(\partial o_{pj}/\partial w_{ji})$ (5)

The first term represents change of error with respect to the output of j-th output node, and the second term represents change of this output with respect to the changes in the weight $w_{ji}$. The first term is obtained from equation (5) above as:

$\partial E_p/\partial o_{pj}=-(t_{pj}-o_{pj})=-\delta_{pj}$ (6)

Since the activation function is linear, it follows that:

$o_{pj}=\Sigma_i w_{ji} i_{pi}$ (7)

from which one can obtain:

$\partial o_{pj}/\partial w_{ji}=i_{pi}$ (8)

Then substituting equations (6) and (7) into equation (5):

$\partial E_p/w_{ji}=\delta_{pj}i_{pi}$ (9)

Comparing the result of equation (9) with the delta rule of equation (1), change in the weight $w_{ji}$ is seen to be proportional to the negative of the derivative of error with respect to $w_{ji}$ upon presentation of pattern p. The above derivation is valid when there is no hidden node in the system.

The generalized delta rule for non-linear systems will now be described. For systems with non-linear activation function, derivation of the delta rule differs from what was shown above for linear systems. This function should be differentiable at each point and be non-decreasing, and the network should also be feedforward, with many layers of hidden nodes being allowed. Every node sends its output to the next forward layer, and receives its input from nodes in the previous layer with the result that given an input set, the output set is determined by a forward pass.

The input to any node j is the sum of the weighted output from nodes connected to it in a feedforward way. This can be written as:

$net_{pj}=\Sigma_i w_{ji} o_{pi}$ (10)

When node i is an input node, then $o_{pi}=i_{pi}$. Then, the output from node j upon being activated by activation function $f_j$ is:

$o_{pj}=f_j(net_{pj})$ (11)

A determination of $\partial E_p/\partial w_{ji}$ is now made. As before, the derivative may be written as:

$$\partial E_p/\partial w_{ji}=(\partial E_p/\partial net_{pj})(\partial net_{pj}/\partial w_{ji}) \quad (12)$$

Using equation (10), the second term in equation (12) is:

$$\partial net_{pj}/\partial w_{ji}=\partial(\Sigma_k w_{jk} o_{pk}/\partial w_{3j}=o_{pi} \quad (13)$$

Applying the chain rule, the first term of equation (12) can be written as:

$$\partial E_p/\partial net_{pj}=(\partial E_p/\partial o_{pj})(\partial o_{pj}/\partial net_{pj}) \quad (14)$$

Using equation (11), the second term in equation (14) can be written as:

$$\partial o_{pj}/\partial net_{pj}=f'_j(net_{pj}) \quad (15)$$

which is the derivative of the activation function for the j-th node calculated at the net input $net_{pj}$ to that node. For the first term in equation (14), two cases may be present: node j may be a node in the output layer, or node j may be a hidden node.

In the case where node j is an output node, it follows from equation (3):

$$\partial E_p/\partial o_{pj}=-(t_{pj}-o_{pj}) \quad (16)$$

Substituting (16) and (15) in (14), then:

$$\partial E_p/\partial net_{pj}=-(t_{pj}-o_{pj})f'_j(net_{pj}) \quad (17)$$

The above derivative may be defined as:

$$\delta_{pj}=-\partial E_p/\partial net_{pj} \quad (18)$$

whereupon equation (17) becomes:

$$\delta_{pj}=t_{pj}-o_{pj})f'_j(net)_{pj}) \quad (19)$$

In the case where node j is a hidden node, application of the chain rule yields:

$$\begin{aligned}\partial E_p/\partial o_{pj} &= \Sigma_k(\partial E_p/\partial net_{pk})(\partial net_{pk}/\partial o_{pj}) \\ &= \Sigma_k(\partial E_p/\partial net_{pk})(\partial \Sigma_i(w_{ki} o_{pi})/\partial o_{pj}) \\ &= \Sigma_k(\partial E_p/\partial net_{pk}) w_{kj}\end{aligned} \quad (20)$$

Since $\partial E_p/\partial net_{pk}=-\delta_{pk}$ from equation (18), then:

$$\partial E_p/\partial o_{pj}=-\Sigma_k \delta_{pk} w_{kj} \quad (21)$$

Substituting (21) and (15) in (14), then:

$$\delta_{pj}=f'_j(net_{pj})\Sigma_k \delta_{pk} w_{kj} \quad (22)$$

Equations (19) and (22) provide a recursive procedure for calculating the $\delta$'s for all the nodes in the net, which is then used to calculate the weight changes in a feedforward network with non-linear activation functions from:

$$\Delta_p w_{ji}=\eta \delta_{pj} o_{pi} \quad (23)$$

Application of the generalized delta rule will now be described. The above equations can be used to develop a procedure for updating the weights of a feedforward network having a non-linear (differentiable and non-decreasing) activation function for each node of the network. The procedure is as follows:

A pair of input/output p is presented to the net. At this phase the input propagates forward through the net, and the output value for each node, $o_{pj}$, is computed. If the j-th node is in the output layer, then $o_{pj}$ is compared with the corresponding target value in that node, which provides the error signal $\delta_{pj}$ for that node, given by equation (19).

Since there is no target value for the hidden nodes, the error signal $\delta_{pj}$ for the output nodes is passed backward through the net to provide an equivalent error signal for the hidden nodes. This pass calculates $\delta_{pj}$ for the hidden nodes from equation (22). The weight changes for all the nodes can then be calculated from equation (23).

Thus the equations required to calculate the weight changes are:

$$\delta_{pj}=(t_{pj}-o_{pj})f'_j(net_{pj}) \text{ for output nodes} \quad (19)$$

$$\delta_{pj}=f'_j(net_{pj})\Sigma_k \delta_{pk} w_{kj} \text{ for hidden nodes} \quad (20)$$

$$\Delta_p w_{ji}=\eta \delta_{pj} o_{pi} \quad (23)$$

The parameter $\eta$ is the learning rate, which is selected to be a small number less than one, and the activation function f is selected to be a sigmoidal function as described earlier.

The above procedure is called pattern learning where the weights are adjusted after presentation of each input/output pattern. In the more commonly used "batch earning" mode, weights are adjusted after all the input/output patterns are presented. After all of the input/output patterns are observed, with weights adjusted after each observation, the process is repeated until a test of convergence is passed.

Neutral networks such as shown in FIG. 3 require training before actual use. Typically, training can occur in a supervised training mode or in an unsupervised training mode. In dynamic security analysis applications, a properly trained neural network can be used to estimate the expected output for a given input with very little computation, and training can result from using off-line study, or from using previous on-line analysis data.

In the present invention, appropriate solution techniques are applied to specific dynamic security analysis sub-problems using severity indices to capture dynamic characteristics of the power system. Although indices patterns may not be easily detectable, the pattern recognition capabilities of neural networks may be used for contingency ranking classification of the sub-problem. This approach represents a significant new way of using neural network in the sense that a highly reduced information is used instead of a complete set of state variables. The use of a network size independent set of severity measures makes this approach very attractive in handling of large scale power systems. The neural network classification process is very fast and significantly beneficial to on-line dynamic security analysis.

Historical or off-line data is used to train the neural network to recognize the pattern of dynamic security indices. The trained neural network is then used to classify contingencies as either definitely safe or potentially severe. In a multi-layer perception approach, the inputs to the artificial neural network ("ANN") must be identified. Understandably, if primary state variables were used as inputs, the number of neural nodes would be large with extensive neural interconnections. The result would be difficulty in generating the required number of training cases even if the extensive computational resources required for such training were available. However, the use of severity indices according to the present invention permits a manageable number of inputs to be handled by selecting an appropriate combination of indices as inputs to the neural network.

The size of the neutral network and its topology is an important consideration, especially with respect to the number of hidden layers and the number of nodes in the hidden layers. The number of neurons and their interconnections should be small enough for ease of training, but large enough to successfully capture the complexity of the behavior of a power system model.

The scope of training may depend upon many factors. The load, generation and the interchange patterns of the power system change with time of day, season, and weather. Also, the pre-contingency configuration of the power system changes due to forced and scheduled outages. Further, for each pre-contingency configuration, there are many post-contingency configurations. The selection of the training cases must, therefore, take advantage of the implicit and explicit assumptions used by the engineers to generalize the results of a small number of cases.

The trained neural network should be applicable to a large class of load and generation profiles pre-fault and post-fault system configurations. Training may be complex due to many factors, including the fact that the number of training cases that can be generated within the constraints of practicality is relatively small, the number of possible pre-contingency system configurations is large, and generating appropriate stable and unstable training cases is difficult.

The object of the training is to permit the neural network to classify a given post-fault condition as either stable, e.g., definitely harmless (wherein the desired neural network output is 0), or unstable, e.g., potentially harmful, wherein the desired neural network output is 1.

Understandably whether the result calculated by an ANN is correct and may be relied upon depends on relevancy of the training cases. Ideally a mechanism to automatically recognize relevance and issue warnings in suspicious cases would be useful, but is presently available.

Further, the neural network learning process should be adoptive. In practice, the neural network should be trained as and when relevant new information regarding the power system becomes available, without destroying the existing knowledge. Although a mechanism to automatically recognize cases containing such new information would be useful, such mechanism is presently unavailable.

Figure 4:
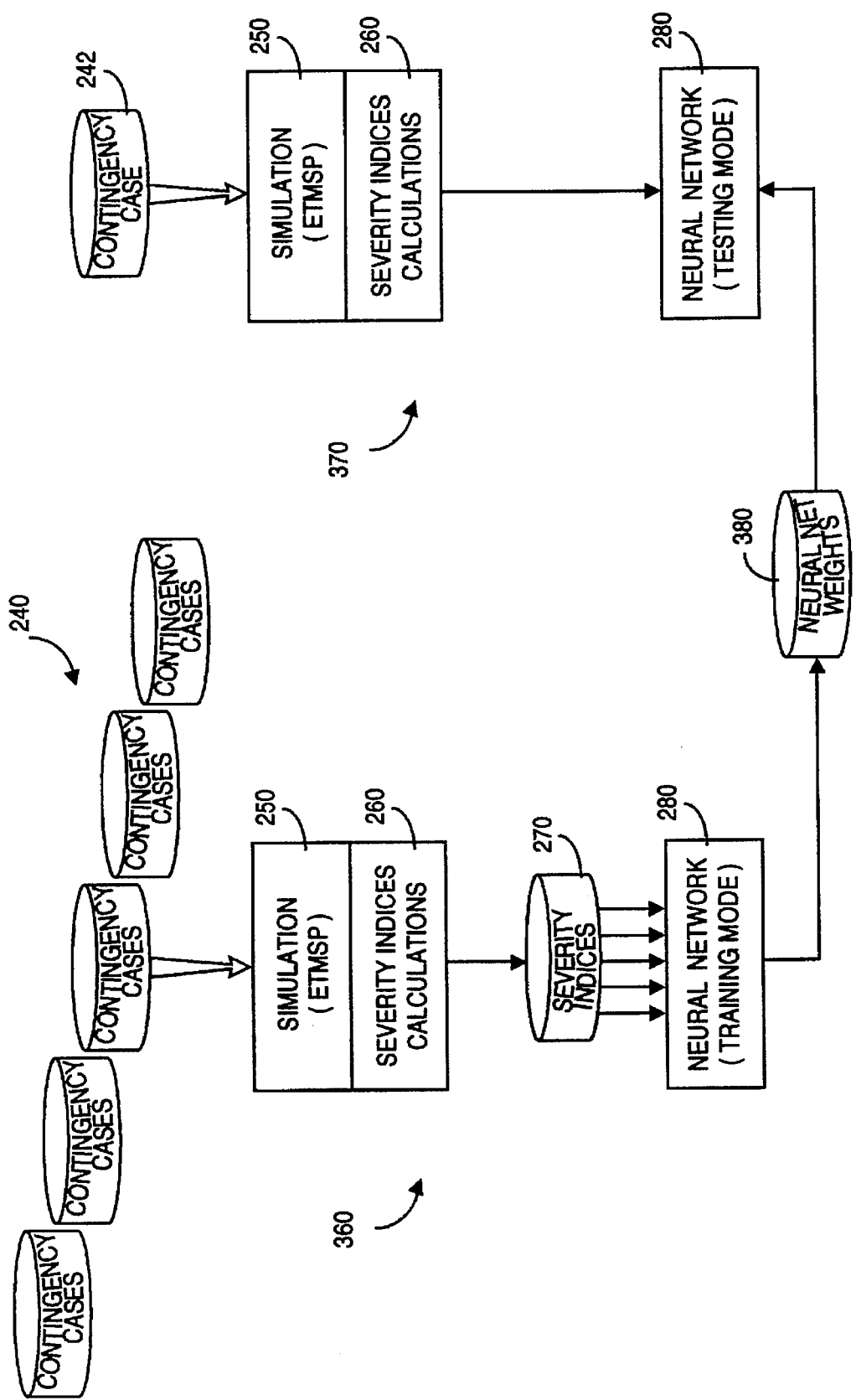
FIG. 4 is a block diagram of a preferred test environment for a neural network based contingency classification system, according to the present invention.

FIG. 4 is a block diagram of a preferred test environment for a neural network based contingency classification, according to the present invention, wherein the left-hand portion of the figure depicts a training mode, and the right-hand portion depicts a testing mode. Similar to what has been described with respect to FIG. 2, a memorialized set of contingency cases. 240 is presented as input to a simulation program 250, preferably an ETMSP version 2P, operating under control of a computer system (e.g., system 210 in FIG. 1). Simulator program 210 calculates and generates the values of severity indices 270 described herein, with the values of these indices being calculated immediately after fault clearing time for a set of contingencies applied to several pre-fault conditions. In the lefthand portion of FIG. 4, these indices are then used to train and test the neural network 280 in a training mode. In the right-hand portion of FIG. 4, the determined neural network weights 380 are provided to the neural network 280 in a testing mode.

A large-scale model of the Canadian Ontario Hydro ("OH") power system, which has 436 busses with 2400 lines and 88 generators, was used for a series that included testing of (a) a contingency and topology specific neural network, i.e., a specialized network for a single contingency and single power system topology, (b) a topology specific neural network, i.e., a specialized network for a specific topology but for various contingencies, and (c) a contingency specific neural network, i.e., a specialized network for a specific contingency but for various power system topologies.

To generate a sufficient number of stable and unstable cases for the above tests, contingency conditions were applied a given set of base cases (precontingency topology and loading level), and fault clearing time was varied for each contingency. The result was a matrix of cases covering stable and unstable conditions in a loading/clearing-time space with a well defined stability boundary, wherein a piecewise linear curve to the left of the stability boundary represented the envelope of the stable cases as determined by step-by-step simulations, and a piecewise linear curve to the right of the boundary was the envelope of unstable cases. For each of the specified tests, the appropriate combination of cases was selected. These cases were then randomly divided into neural network training and test cases.

For each contingency case, a set of 53 indices was computed immediately following fault clearing, and a class-mean feature extraction procedure selected 24 of the indices for use as inputs to a neural network. In the training mode, the desired output of the neural network was set to 0.0 for stable, definitely harmless, cases, and was set to 1.0 for unstable, potentially harmful, cases. In the testing mode, an output value greater than 0.5 was considered to imply instability, e.g., potentially harmful.

A three layer neural network was found to be sufficient to classify contingencies in dynamic severity analysis. The first layer included one node for each of severity indices as input, and the intermediate or hidden layer included a small number of nodes. Although the test data described herein were obtained with a single output node, the final layer included either one node for the entire power system, or a few nodes, one for each problem area in the system. During testing, initially several different number of nodes were tried in the hidden layer. To obtain acceptable results, it was found that at least five hidden layer nodes should be used, and eight hidden nodes were used for the data described herein.

This neural network architecture was then used for the following tests. A contingency and topology specific neural network was trained to recognize unstable operating conditions in a given precontingency configuration with respect to a single contingency for which 63 different cases (7 loading levels and 9 fault clearing times) were created. From these cases, 50 were randomly selected as training cases and the remaining 13 were used as test cases, with tests being repeated several times for that contingency with a different selection of training and test cases. This test was then repeated for 5 other contingencies.

Consequently, six different neural networks were created to test the available six distinct contingency cases. All six neural networks correctly identified the unstable cases. In addition, one neural network classified one marginally stable case potentially severe (unstable), a result consistent with the goal of attaining a reasonably conservative classification.

A neural network trained with several contingencies was tested, to probe the ability of a single neural network to classify multiple contingencies under different loading conditions in a single pre-contingency model of the power system. Seven different levels of generation at a major power plant (Bruce NGS) were used, with power generation being varied from 4650 MW to 5250 MW in 100 MW increments. Three hundred seventh-eight cases were generated for these pre-contingency steady-state conditions by simulating 6 different contingencies with 9 different fault clearing times.

Of these 378 cases, 300 were randomly selected as training cases. The remaining 78 cases were used as test cases, with the tests being repeated for different random selections of the training and test cases. In practice, contingency classification by the neural network was very reliable as shown in TABLE 1, below, with only two marginally stable cases were classified as potentially. severe (unstable).

TABLE 1

| Classification by Simulation | Classification by Neural Network | |
| --- | --- | --- |
| | Definitely Harmless | Severe/Potentially Severe |
| Stable | 96 | 2 |
| Unstable | 0 | 280 |

A neural network trained with several pre-contingency configurations was also examined to test single neural network classification of different power system topologies with respect to a single contingency. Six different pre-contingency configurations were considered and, as in the previous tests, seven different levels of generation at the Bruce NGS power plant were considered. A single contingency was applied to six configurations, and nine different fault clearing times were used. Again, the classification of the contingencies by the neural network was very precise: one marginally stable case was classified as potentially severe (unstable), and all other cases were classified correctly as either stable or unstable.

Neural network classification may be illustrated by test environment examples wherein the neural network output was produced by a neuron having a sigmoid shape characteristic. The neural network output varies between 0.0 and 1.0, with an abrupt change occurring between these two limits. It is this abruptness that permits classifying inputs to the neuron into two different categories, with a demarkation threshold of 0.5. This output variation may also be represented with a contour plot in the problem space. In such a plot, classification quality is affected by the abruptness of the change, e.g., the closeness of the contour lines around the middle point of 0.5.

This simple one-dimensional example can be generalized into a multi-dimensional problem space of multiple indices, wherein x-axis and y-axis plots of a neural network test for a specific contingency can represent, respectively, fault clearing time and generation level data. Contour plots representing neural network output values may be plotted with different contour lines representing increments in output value. A curve will demark the stability boundary determined by the neural network, i.e., output value=0.5, wherein a piecewise linear curve to the left of this stability boundary will represent the envelope of the stable cases as determined by step-by-step simulations, and a piecewise linear curve to the right will represent the envelope of unstable cases.

Two computational procedures for evaluation of the driving point impedance were developed. The first procedure assumes that the real and reactive powers at the internal bus of a generator can be approximated by a constant component and by a component resulting from a constant admittance between the internal bus of the machine and an infinite bus. These components can be calculated from the system state and the equations of the complete system. The parameters of the equivalent system are estimated using these components.

The second procedure is based on the direct calculation of the driving point impedance from system parameters and its use as the impedance between the generator and an infinite bus. However, the calculated impedance is dominated by the impedance to the electrically-closest machine, which domination usually results in an overly optimistic stability assessment.

Utilizing these software tools, applicants extensively analyzed the behavior of the indices using the Canadian Ontario Hydro ("OH") power plant and the Minnesota Northern States Power ("NSP") system models. These analyses confirm that at least some of the indices clearly differentiate between severe and non-severe contingencies, whereas some indices do not.

The present invention uses maximum phase angle deviation (DELDEL) and maximum voltage dip (VLTDIP) as objective criteria to evaluate ranking capabilities of various severity indices for the severity of the contingency under consideration. These data are determined from the results of complete time simulation of each contingency. Ranking involves mapping of effects of the contingencies in the multi-dimensional space of state variables of the power system to a single dimensional severity space. Those skilled in the relevant art will appreciate that any such mapping relies on somewhat subjective criteria, and that even experienced utility engineers can have subjective opinions regarding the relative severity of different contingencies.

The first benchmark measure (DELDEL) is based on the deviation of the phase angles of generator internal buses from their pre-contingency steady-state values, where phase angles are in radians relative to the center of inertia. DELDEL is the maximum of these deviations taken over all the generators and in every time step of a complete time domain simulation, e.g., as short as 5 to 10 seconds.

The second benchmark measure (VLTDIP) is based on the dip (per unit value) of bus voltages from their precontingency steady-state values. VLTDIP is the maximum dip taken over all buses and in every time step of a complete time domain simulation, e.g., 5 or 10 seconds.

Figure 5:
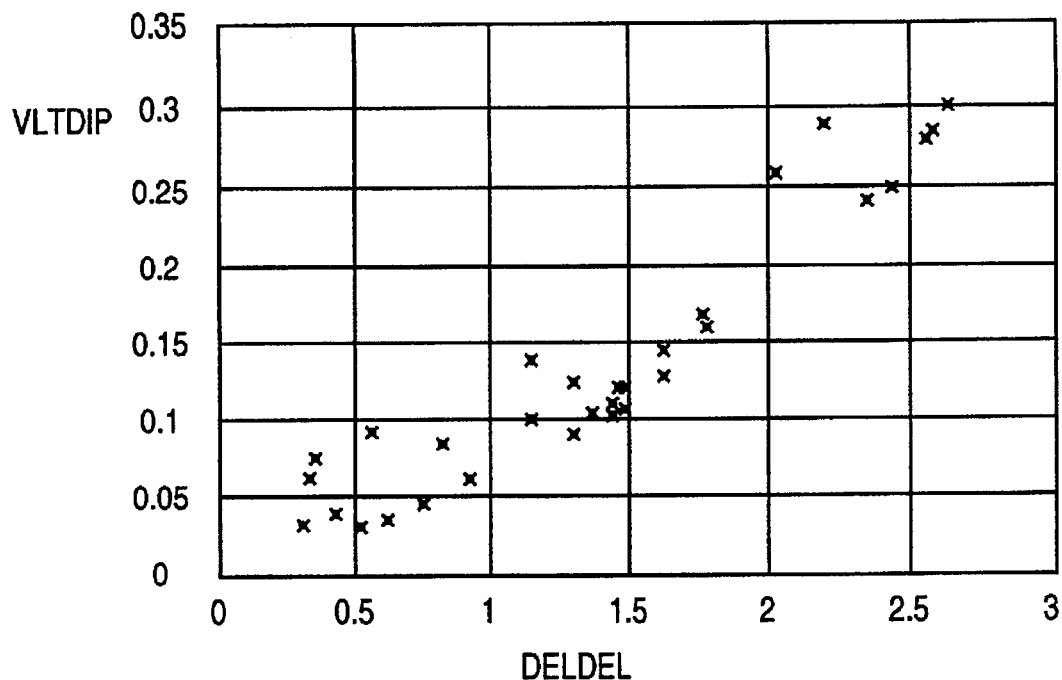
FIG. 5 depicts correlation between independent measures VLTDIP and DELDEL for an Northern States Power model ("NSP"), according to the present invention.

For each contingency, DELDEL and VLTDIP are obtained from ETMSP simulations and stored for future reference. FIG. 5 shows the correlation between the independent measures VLTDIP and DELDEL, each data point corresponds to a single NSP contingency case, first pass. The DELDEL and VLTDIP case measures are given by the respective point (x,y) coordinates, with points in the upper right quadrant of FIG. 5 corresponding to the most severe contingencies. Although reasonably well correlated, these benchmark measures are not entirely consistent, and it is likely that no two independent severity measures can be entirely consistent in general.

The software for calculating the dynamic severity indices was used to generate these indices for 39 NSP and 36 Ontario Hydro contingency cases immediately after fault clearing, and five simulation steps thereafter, the latter including impact of system dynamic interactions.

Figure 6:
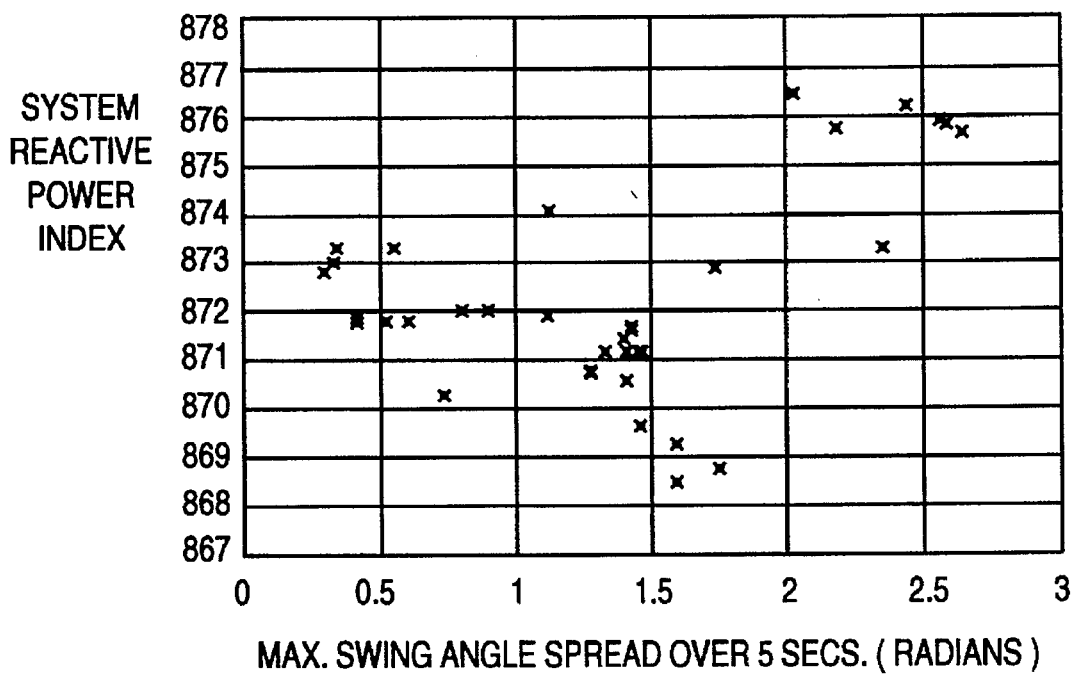
FIG. 6 depicts data for the NSP system with thirty-nine contingencies, immediately after fault clearing.

The influence of the dynamic interaction on the quality of a severity index (system reactive power change) is shown illustrated in FIG. 6 for the NSP cases. Immediately after fault clearing, the index correctly captures the relative severity of the contingencies, and as the effects of fault clearing propagate through the system, correlation of the index to the independent severity improves.

Additional examples of severity indices calculated five simulation steps after fault clearing for the NSP cases are presented in FIGS. 7–11, wherein each data point represents a single NSP contingency. In these figures, the point x-coordinate represents the DELDEL reference measure (based on 5 second simulations) for that case, and the point y-coordinate represents a selected index (based on simulations terminated only 5 steps after fault-clearing).

Figure 7:
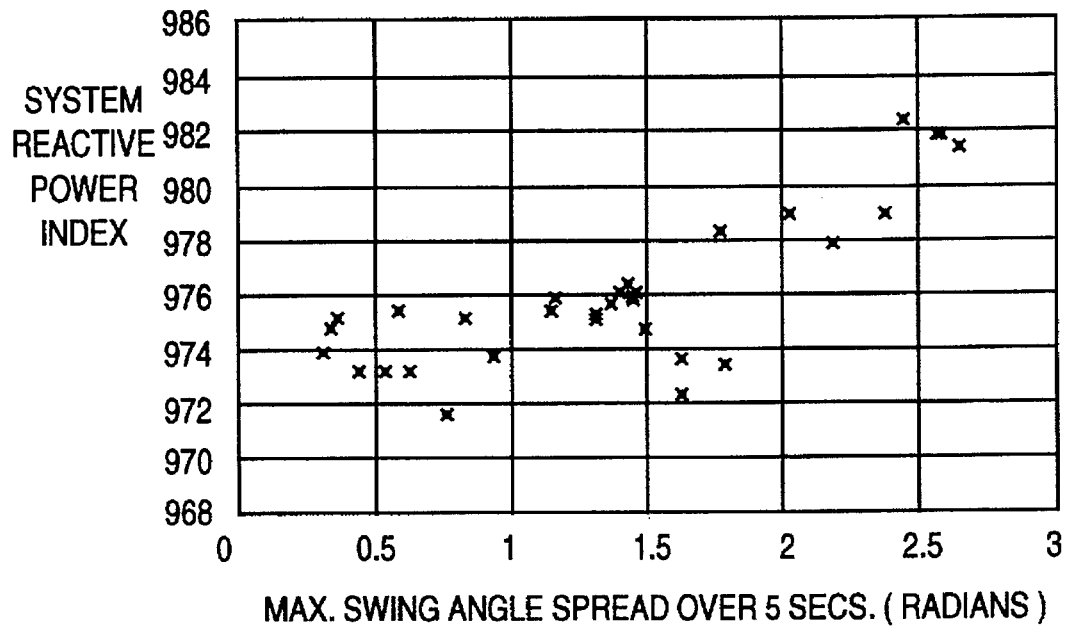
FIG. 7 depicts data for the NSP system with 39 contingencies, for SYSQ versus DELDEL.

FIG. 7 represents behavior of the system reactive power index (SYSQ) against the reference angular severity measure (DELDEL). The top portion of the figure depicts index values immediately after fault clearing, whereas the bottom of the figure represents index values five simulation steps thereafter.

Figure 8:
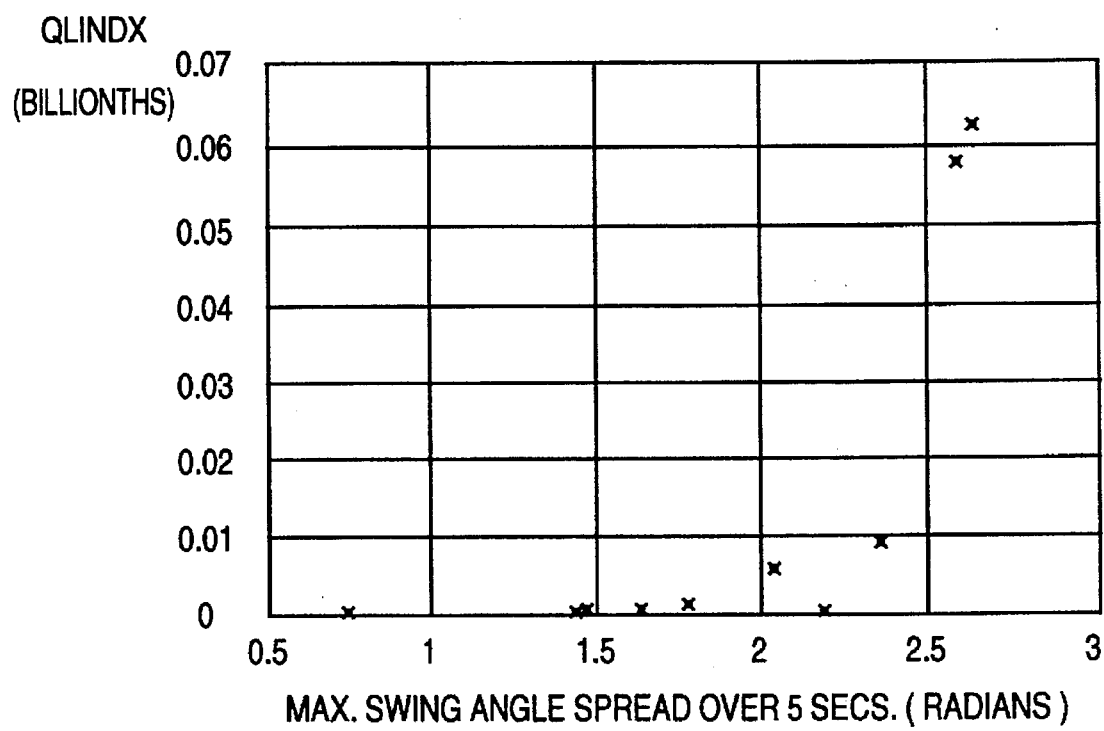
FIG. 8 depicts data for the NSP system with 39 contingencies, for QLINDX versus DELDEL.
Figure 9:
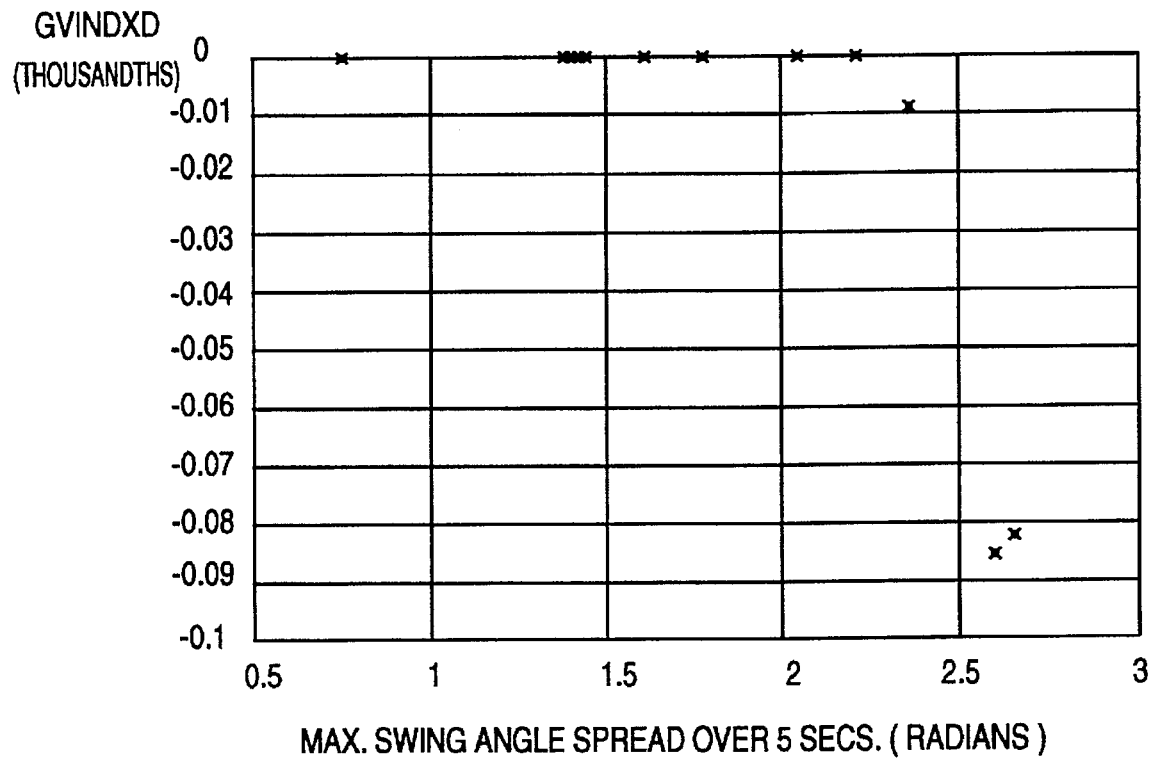
FIG. 9 depicts contingency severity for the NSP system with 39 contingencies, as measured by GVINDXD.
Figure 10:
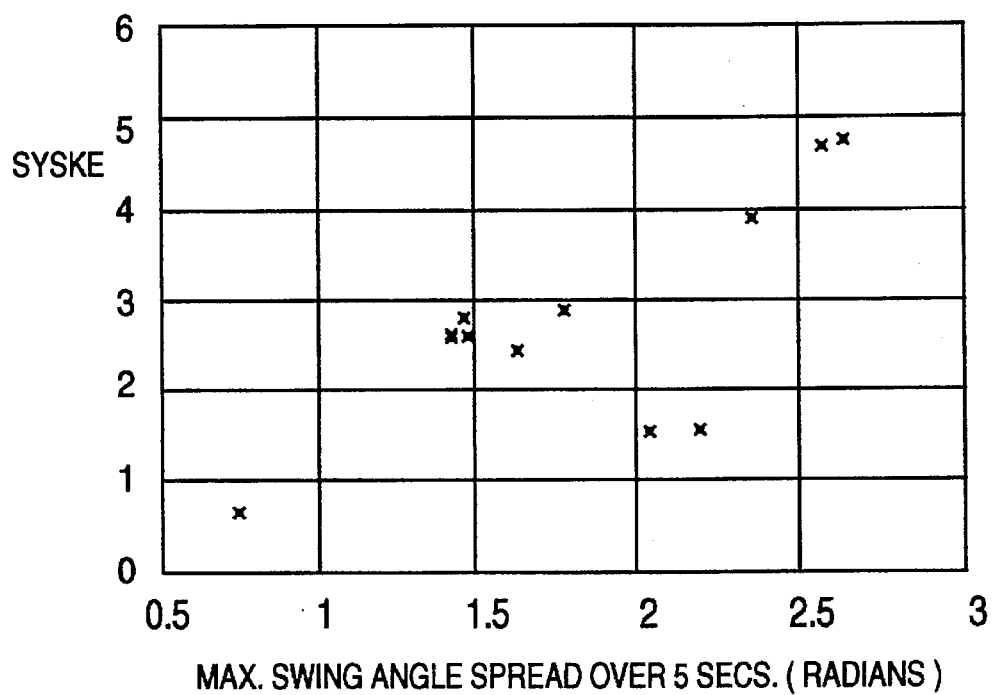
FIG. 10 depicts contingency severity for the NSP system with 39 contingencies, as measured by SYSKE.
Figure 11:
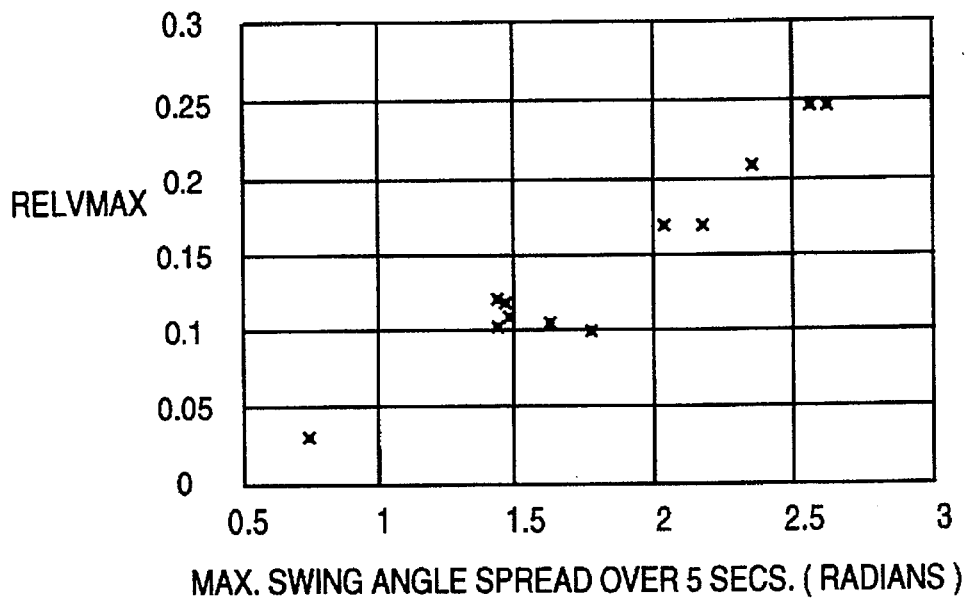
FIG. 11 depicts contingency severity for the NSP system with 39 contingencies, as measured by RELVMAX.

FIG. 8 depicts data for the NSP system, measured by the line Q flow index QLINDX plotted against the reference angular increment severity measure DELDEL. In FIG. 9, contingency severity is measured by the generator terminal voltage dip index (GVINDXD), while in FIG. 10 contingency severity is measured by the system kinetic energy index (SYSKE). FIG. 11 depicts contingency severity for the NSP system as measured by the voltage dip index (RELVMAX).

As it can be seen from the plots for the NSP cases, the severity indices based on the line reactive power (QLINDX), generator terminal voltage dip (GVINDEXD), system kinetic energy (SYSKE) with respect to the center of inertia, maximum bus voltage dip (RELVMAX), and deviation of system reactive power (SYSQ) adequately capture the relative severity of the different contingencies. Additional indices have also shown positive correlation with the reference severity.

Figure 12:
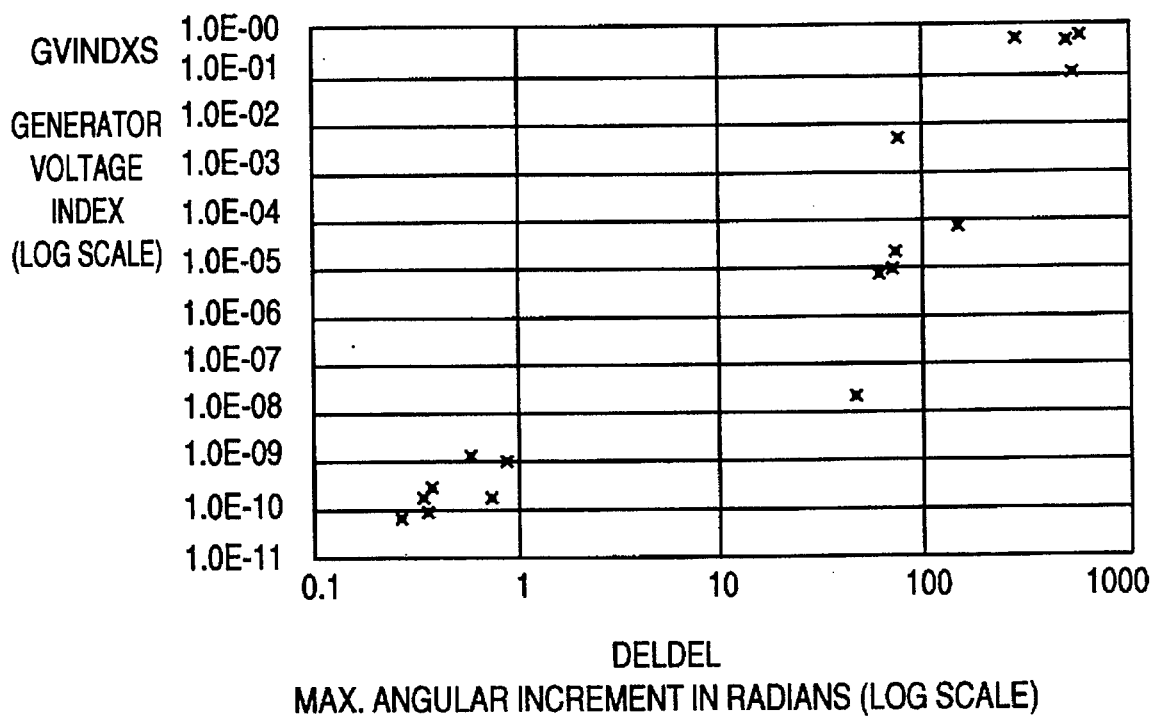
FIG. 12 depicts GVINDX versus DELDEL for the Ontario Hydro model for 36 contingencies, showing stable and unstable cases.
Figure 13:
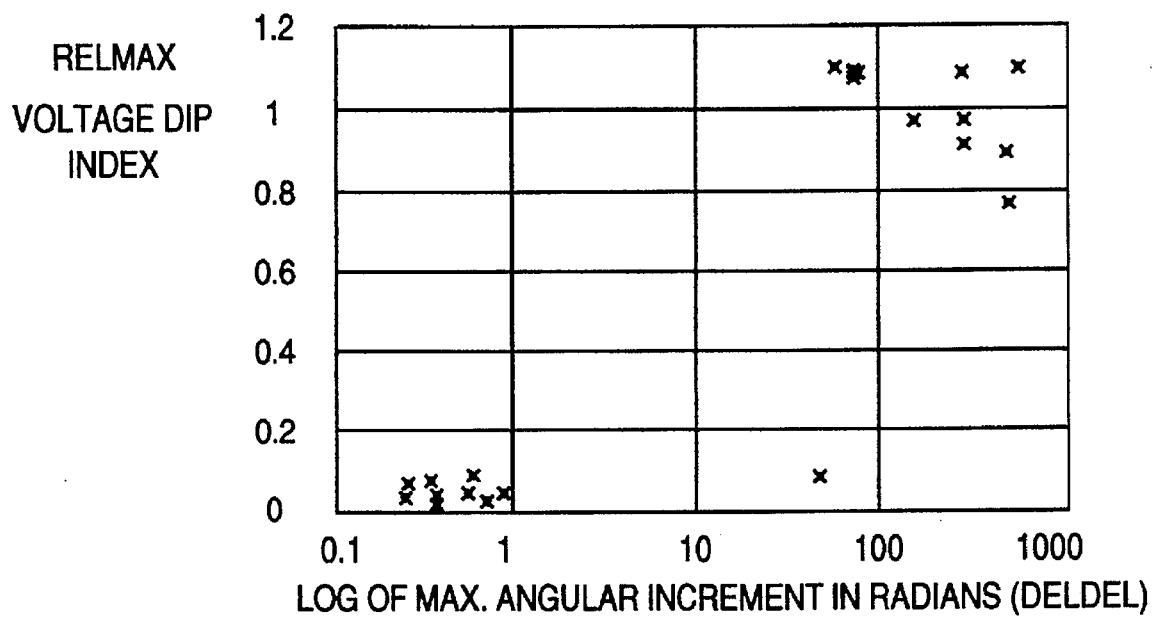
FIG. 13 depicts RELVMAX versus DELDEL for the Ontario Hydro model for 36 contingencies, showing stable and unstable cases.
Figure 14:
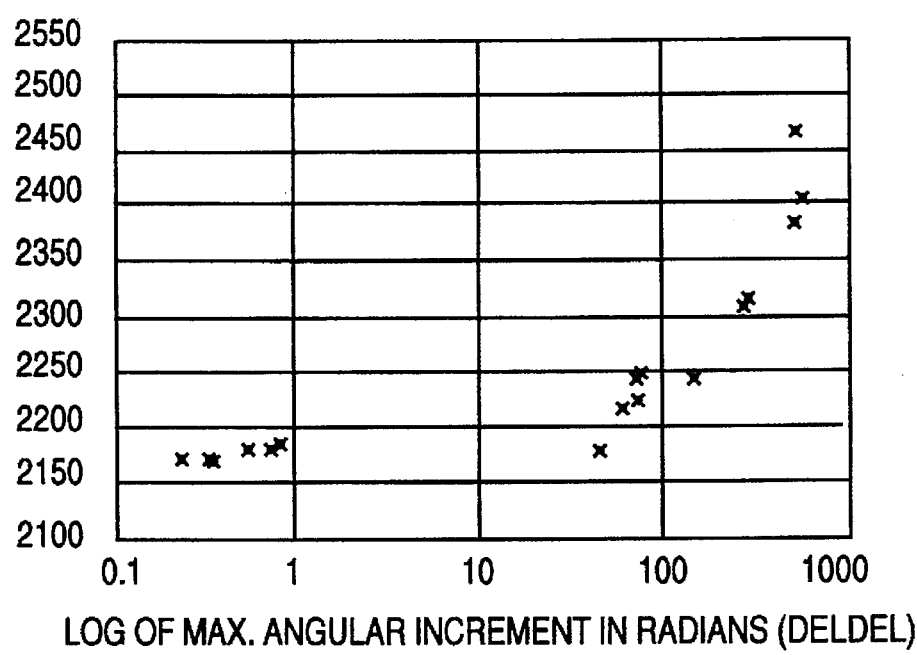
FIG. 14 depicts SYSQ versus DELDEL for the Ontario Hydro model for 36 contingencies, showing stable and unstable cases.

FIGS. 12–14 depict contingency ranking capability of some of the indices for the Ontario Hydro cases, for 36 contingencies, including 13 unstable cases. In FIG. 12, the generator voltage dip index (GVINDX) is plotted against the maximum angular increment (DELDEL). For the unstable cases, DELDEL computed over 5 seconds of simulations is a very large number, with values exceeding 3.14 corresponding to unstable cases. Ideally, an index should show a sharp value change as a contingency became unstable. This in fact is apparent in FIG. 13 and FIG. 14 where the maximum bus voltage dip (RELVAMAX) and the generator voltage index (GVINDXS), respectively, increase sharply for (DELDEL) >3.14.

From the foregoing, it will be appreciates that each index can capture certain aspects of the overall contingency severity information for the power system. While individual indices may contain complementary information, a suitable combination of indices provides comprehensive severity information. The individual indices can be combined in many different ways to produce a composite severity index. For example, a composite index may be calculated by simply summing the individual severities. It is possible to define more complicated composite indices, includes indices generated using neural networks such as network 280.

In the above-described tests, the CPU time required for training the neural network ranged from about 5 to 50 seconds on a 15.6 MIPS SUN workstation. Once the network is trained, CPU time required for classification of a case is in the order of milliseconds.

In summation, it will be appreciated that the present invention provides a new approach to the use neural networks in monitoring large scale power systems. A single neural network may be used to classify contingencies as stable or potentially unstable for a number of power system pre-contingency configurations. Further, by using a fixed number of system state measurement indices as input to the neural network, the implementation complexity and CPU requirements are made independent of the system size. A single neural network may be trained using relatively few training cases for various contingencies, configurations and loading levels in a given area of a power system. Further, it is unnecessary to train the neural network on every possible contingency and configuration in the system, with only representative samples being required.

Other features and advantages of the invention will appear from the following description in which the preferred embodiments have been set forth in detail, in conjunction with the accompanying drawings. Modifications and variations may be made to the disclosed embodiments without departing from the subject and spirit of the invention as defined by the following claims.

What is claimed is:

1. A method for real-time evaluation of fault contingencies upon the dynamic security of a power system that includes power generators and power-carrying lines, the method comprising the following steps:

(a) defining a set of indices describing a fault-induced deviation from a pre-fault steady state condition of said power system;

(b) forming from said set of indices a subset of composite indices for each fault contingency of interest, wherein a fault contingency of interest includes a fault experienced by said power system, for which fault contingency real-time evaluation is desired, wherein said subset of composite indices is formed as follows:

(b-1) calculating a change from pre-fault steady-state condition of said power system for each system variable defined by an index in a said set of indices;

(b-2) segregating changes calculated at step (b-1) into positive-signed values and negative-signed values;

(b-3) normalizing said positive-signed values and said negative-signed values so segregated at step (b-2);

(b-4) raising to a power n, $n \geq 4$, values normalized at step b-3);

(b-5) combine values so power-raised in step (b-4) to yield at least one composite index selected from the group consisting of (a) terms corresponding to at least some of said positive-signed values, (b) terms corresponding to at least some of said negative-signed values, (c) terms corresponding to at least some of said positive-signed values and corresponding to at least some of said negative-signed values, and (d) terms corresponding to a difference between at least some of said positive-signed values and some of said negative-signed values;

(c) providing a computer system including a neural network to classify in terms of at least stability and instability each of said composite indices, said neural network receiving said composite indices as input; and (d) providing from an output of said neural network at least one indication of relative stability of said power system in response to a said fault contingency of interest.

2. The method of claim 1, wherein at step (a), said set of indices includes power-carrying line indices and generator indices.

3. The method of claim 1, wherein step (a) includes providing at least one set of indices selected from the group consisting of (i) generator real power output normalized by inertia, (ii) generator reactive power output normalized by inertia, (iii) generator apparent power normalized by inertia, (iv) generator bus voltage, (v) generator rotor angle (DELTA) with respect to the center of inertia, and (vi) generator (Q-Qbias)/P where Q is reactive power, Qbias is a user-specified tuning parameter, and P is real power.

4. The method of claim 1, wherein step (a) includes providing at least one set of indices selected from the group consisting of (i) voltage line sending end real power (P) normalized by line reactance, (ii) voltage line sending end reactive power (Q) normalized by line reactance, (iii) line phase angle, and (iv) line sending end (Q-Qbias)/P where Q is reactive power, Qbias is a user-specified tuning parameter, and P is real power.

5. The method of claim 1, wherein step (a) includes providing at least one set of indices selected from the group consisting of (i) bus load normalized by admittance of voltage lines, (ii) bus voltage, (iii) real power flows in pre-specified interfaces normalized by admittance of available interface voltage lines), and (iv) reactive power flows in pre-specified interfaces normalized by admittance of available interface voltage lines.

6. The method of claim 1, wherein step (a) includes providing at least one set of indices selected from the group consisting of (i) power system reactive power generation (TOTQ) normalized by sum of P, and (ii) power system stress defined by sum of (P*DELTA)/(sum of P)−0.5*TOTQ.

7. The method of claim 1, wherein step (b) is carried out using a simulation program.

8. The method of claim 7, wherein said simulation program includes a program selected from the group consisting of (i) a transient stability simulation program, and (ii) an extended midterm stability program.

9. The method of claim 1, wherein step (b) is carried out using a simulation program and includes:

(i) initializing said simulation program with a description of said power system corresponding to a relevant state of interest of said power system;

(ii) providing said simulation with a description of contingency events said power system may experience;

(iii) initiating and operating said simulation until a last description of contingency events has been provided, whereupon said simulation is halted; and (iv) calculating a set of said composite indices.

10. The method of claim 1, wherein at step (c), said neural network includes at least three layers and at least six nodes.

11. The method of claim 1, wherein at step (c), said neural network includes an off-line training model deviation mode, wherein a set of pairs of index values and corresponding power system stability classification data is input to said neural network, wherein training cases are concentrated at a boundary separating stable from unstable cases for said power system.

12. The method of claim 1, wherein step (c) includes screening-out from further processing contingencies associated with a safe and stable state of said power system.

13. The method of claim 1, wherein step (d) includes at least one step selected from the group consisting of (i) providing a visual indication of a post-contingency state of said power system for a human operator, (ii) initiating corrective action to alleviate effects of a present fault contingency on said power system, and (iii) initiating preventive action to alleviate effects of a present fault contingency on said power system.

14. The method of claim 1, including a further step of providing to said neural network a security knowledge base memorializing historical contingencies.

15. The method of claim 14, including a further step of updating said security knowledge base following analysis of at least selected contingencies presented to said power system.

* * * * *

UNITED STATES PATENT AND TRADEMARK OFFICE
CERTIFICATE OF CORRECTION

PATENT NO. : 5,625,751

DATED : April 29, 1997

INVENTOR(S) : Brandwajn et al.

It is certified that error appears in the above-indentified patent and that said Letters Patent is hereby corrected as shown below:

Column 15, line 8, delete "$\partial net_{pj}/\partial w_{ji} = \partial(\sum_k w_{jk} o_{pk}(\partial w_{3ji} = o_{pi}$" and insert therefor --$\partial net_{pj}/\partial w_{ji} = \partial(\sum_k w_{jk} o_{pk}(/\partial w_{3ji} = o_{pi}$--.

Signed and Sealed this

Sixteenth Day of September, 1997

Attest:

BRUCE LEHMAN

*Attesting Officer*    *Commissioner of Patents and Trademarks*